(12) United States Patent
Hashemzadeh

(10) Patent No.: US 9,850,327 B2
(45) Date of Patent: Dec. 26, 2017

(54) USE OF MODIFIED WATER-SOLUBLE POLYMERS AS CROSSLINKING AUXILIARY AGENTS

(71) Applicant: Wacker Chemie AG, Munich (DE)

(72) Inventor: Abdulmajid Hashemzadeh, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/023,574

(22) PCT Filed: Sep. 23, 2014

(86) PCT No.: PCT/EP2014/070283
§ 371 (c)(1),
(2) Date: Mar. 21, 2016

(87) PCT Pub. No.: WO2015/044153
PCT Pub. Date: Apr. 2, 2015

(65) Prior Publication Data
US 2016/0208031 A1    Jul. 21, 2016

(30) Foreign Application Priority Data
Sep. 25, 2013   (DE) .................. 10 2013 219 325

(51) Int. Cl.
| | |
|---|---|
| *C08F 116/06* | (2006.01) |
| *C08F 220/18* | (2006.01) |
| *C08F 261/04* | (2006.01) |
| *C08F 212/08* | (2006.01) |
| *C08F 220/32* | (2006.01) |
| *C08F 230/08* | (2006.01) |

(52) U.S. Cl.
CPC .......... *C08F 116/06* (2013.01); *C08F 220/18* (2013.01); *C08F 261/04* (2013.01); *C08F 212/08* (2013.01); *C08F 220/32* (2013.01); *C08F 230/08* (2013.01)

(58) Field of Classification Search
CPC .............................. C08F 116/06; C08L 33/068
See application file for complete search history.

(56) References Cited

U.S. PATENT DOCUMENTS

| | | | |
|---|---|---|---|
| 6,197,863 B1 | 3/2001 | Eck et al. | |
| 6,884,468 B1 * | 4/2005 | Abundis | ............... D21H 19/58 |
| | | | 427/391 |
| 2001/0024644 A1 | 9/2001 | Kohlhammer et al. | |
| 2002/0034613 A1 * | 3/2002 | Liu | .......... B41M 5/52 |
| | | | 428/32.34 |
| 2002/0052459 A1 | 5/2002 | Kohlhammer et al. | |
| 2003/0044611 A1 | 3/2003 | Stark et al. | |
| 2006/0264572 A1 | 11/2006 | Hashemzadeh et al. | |
| 2008/0098933 A1 | 5/2008 | Killat | |
| 2012/0329907 A1 | 12/2012 | Hong et al. | |
| 2012/0329908 A1 | 12/2012 | Chen et al. | |
| 2012/0329909 A1 | 12/2012 | Kuehn et al. | |
| 2015/0315374 A1 | 11/2015 | Hashemzadeh | |

FOREIGN PATENT DOCUMENTS

| | | |
|---|---|---|
| CN | 102300940 A | 12/2011 |
| DE | 101 40 131 B4 | 4/2003 |
| DE | 10 2006 050 336 A1 | 5/2008 |
| DE | 10 2012 223 620 A1 | 6/2014 |
| EP | 3 721 004 A2 | 7/1996 |
| EP | 3 723 975 A1 | 7/1996 |
| EP | 0 885 246 A1 | 12/1998 |
| EP | 0 896 029 A1 | 2/1999 |
| EP | 1 724 288 A1 | 11/2006 |
| IN | 05532CN2011 A | 8/2015 |
| WO | 2006122705 A1 | 11/2006 |
| WO | 2010086217 A2 | 8/2010 |
| WO | 2012177448 A1 | 12/2012 |

OTHER PUBLICATIONS

Randrup et al, "Polymer Handbook", 2nd Edition, J. Wiley & Sons, New York (1975).
Ox, T. G., Bull. Am. Physics Soc. 1, 3, p. 123 (1956).

* cited by examiner

*Primary Examiner* — Kuo-Liang Peng
(74) *Attorney, Agent, or Firm* — Brooks Kushman P.C.

(57) ABSTRACT

Modified water soluble polymer crosslinking agents can be used by themselves or in combination with conventional crosslinking agents, other crosslinkable base polymers, and/or hardeners. The dried composition is redispersible in water prior to crosslinking, but is stable to water after crosslinking, also offering improved stain resistance.

21 Claims, No Drawings

USE OF MODIFIED WATER-SOLUBLE POLYMERS AS CROSSLINKING AUXILIARY AGENTS

CROSS REFERENCE TO RELATED APPLICATIONS

This application is the U.S. National Phase of PCT Appln. No. PCT/EP2014/070283 filed Sep. 23, 2014, which claims priority to German Application No. 10 2013 219 325.4 filed Sep. 25, 2013, the disclosures of which are incorporated in their entirety by reference herein.

BACKGROUND OF THE INVENTION

1. Field of the Invention

The invention relates to the use of modified water-soluble polymers as crosslinking assistants, optionally in combination with film-forming polymers, epoxy components or other hardeners, for example for coatings or adhesives, such as fiber-coating compositions, paper-coating compositions or chemical products for use in civil engineering.

2. Description of the Related Art

Water-soluble polymers, for example polyvinyl alcohols, are widely used, inter alia as additives for coatings or adhesives and particularly as a protective colloid for polymers based on ethylenically unsaturated monomers. However, the high water solubility of such polymers often becomes adversely conspicuous when in-service products become exposed to water. To improve waterfastness, compositions comprising water-soluble polymers have for example been employed in combination with hardeners or crosslinkers. Crosslinkers having isocyanate or aldehyde groups have thus been used to crosslink polyvinyl alcohol at room temperature. After crosslinking, the products do have an improved waterfastness, yet crosslinkers of this type are a health concern which necessitates higher safety measures for their use. In addition, the crosslinking reaction usually does not go to completion, so the in-service products may evolve harmful compounds for a prolonged period.

Known crosslinking systems further include epoxy-containing compounds which, however, only lead to crosslinking at comparatively high temperatures, for example above 100° C. But there are many applications, for example in civil engineering, such as tile adhesives or leveling screeds, where the crosslinking reaction has to take place at room temperature. Amines may additionally be added to crosslink epoxy-containing compounds at room temperature. With this procedure, the crosslinking of the water-soluble polymers is insufficient and the wetfastness of products obtained therefrom is still not fully satisfactory.

Epoxy resins are extensively recommended as crosslinkers, including in particular for protective colloid-stabilized polymer powders, as for example described in WO 2012/177448, US 2012/0329909, US 2012/0329908, US 2012/0329907 or WO 2010/086217. EP 0721004 describes water-redispersible polymer powders comprising film-forming functionalized polymers and also reactive compounds, wherein said reactive compounds are suitable for crosslinking on the functionalized polymers. US 2001/0024644 describes protective colloid-stabilized polymer powders whose base polymers contain epoxy monomer units. EP 0896029 teaches crosslinkable polymer compositions based on water-insoluble polymers as well as water-soluble polymers, wherein at least one of the two polymers contains crosslinkable groups capable of forming covalent bonds with insoluble organic or inorganic solids.

EP 0885246 discloses the use of water-soluble polymers based on 2-acrylamido-2-methylpropansulfonic acid (AMPS) and N-methylolacrylamide solution (NMA) as protective colloids for water-insoluble polymers. Protective colloids of this type, however, tend to evolve formaldehyde, and this is deprecated for health reasons. Moreover, protective colloids based on such monomers are not resistant to water. EP 0723975 describes the copolymerization of ethylenically unsaturated epoxides and also of further ethylenically unsaturated monomers in the presence of small amounts of protective colloids and also the employment of such products in coatings or binders to improve the adhesive properties thereof. DE-A 102012223620 finally teaches protective colloids for film-forming polymers that are obtainable by polymerization of optionally functionalized ethylenically unsaturated monomers in the presence of water-soluble polymers.

A further issue is the inadequate staining resistance of the abovementioned coatings, for example on contact with colored beverages, for example fruit juices or coffee.

SUMMARY OF THE INVENTION

The problem addressed by the present invention in relation to this background was that of providing novel measures for preparing very highly water-resistant coatings. Formaldehyde-evolving crosslinking assistants should be eschewable here. The crosslinking assistants should be crosslinkable even without addition of commonly used crosslinkers, but should ideally also be compatible with the commonly used crosslinkers and crosslink in an advantageous manner under the influence of such commonly used crosslinkers. In addition, the crosslinking assistants should lead to in-service products having improved staining resistance, for example with regard to colored beverages, such as fruit juices or coffee, and/or to in-service products allowing easier or fuller removal of stains therefrom. The incipit issues should ideally not be present at all or only to a reduced degree. Surprisingly, these and other problems were solved by water-soluble polymers that have been modified in a certain way being employed as crosslinking assistants.

DETAILED DESCRIPTION OF THE PREFERRED EMBODIMENTS

The present invention accordingly provides for the use of modified water-soluble polymers as crosslinking agents, characterized in that the modified water-soluble polymers are obtainable by free-radically initiated polymerization of
a) one or more ethylenically unsaturated monomers bearing one or more epoxy, amine, carboxylic acid, carboxylic anhydride and/or silane groups, and
b) one or more ethylenically unsaturated monomers other than said monomers a)
in the presence of 25 to 80 wt % of one or more water-soluble polymers, based on the overall weight of the modified water-soluble polymers.

The ethylenically unsaturated monomers bearing one or more epoxy, amine, carboxylic acid and/or carboxylic anhydrides are preferably of 1 to 20 carbon atoms, more preferably of 1 to 10 carbon atoms, which may be in a linear or branched, open-chain or cyclic arrangement. The ethylenically unsaturated monomers bearing amine groups may concern primary, secondary or tertiary amines.

Examples of ethylenically unsaturated monomers bearing one or more epoxy groups (epoxy-functional monomers) are glycidyl acrylate, glycidyl methacrylate (GMA) or allyl glycidyl ether; particular preference is given to glycidyl acrylate and glycidyl methacrylate; glycidyl methacrylate is most preferable.

Examples of ethylenically unsaturated monomers bearing one or more amine groups (amine-functional monomers) are 2-dimethylaminoethyl methacrylate, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine or vinylpyridine.

Examples of ethylenically unsaturated monomers having one or more carboxylic acid groups (carboxyl-functional monomers) are ethylenically unsaturated mono- or dicarboxylic acids, preferably acrylic acid, methacrylic acid, fumaric acid and maleic acid; monoesters of fumaric acid or maleic acid, such as the diethyl or diisopropyl esters. Maleic anhydride is one example of an ethylenically unsaturated monomer bearing a carboxylic anhydride group (carboxylic anhydride-functional monomer).

Examples of ethylenically unsaturated monomers bearing one or more silane groups (silane-functional monomers) are ethylenically unsaturated silicon compounds of general formula $R^1SiR^2{}_{0-2}(OR^3)_{1-3}$, where $R^1$ is $CH_2{=}CR^4{-}(CH_2)_{0-1}$ or $CH_2{=}CR^4CO_2(CH_2)_{1-3}$, $R^2$ is $C_1$-$C_3$ alkyl, $C_1$-$C_3$ alkoxy or halogen, preferably Cl or Br, $R^3$ is branched or unbranched, optionally substituted alkyl of 1 to 12 carbon atoms, preferably 1 to 3 carbon atoms, or acyl of 2 to 12 carbon atoms, wherein $R^3$ may optionally be interrupted by an ether group, and $R^4$ is H or $CH_3$.

Preferred silane-functional monomers are γ-acryloyloxypropyltri(alkoxy)silanes, γ-methacryloyloxypropyltri(alkoxy)silanes, α-methacryloyloxymethyltri(alkoxy)silanes, γ-methacryloyloxypropylmethyldi(alkoxy)silanes; vinylsilanes such as vinylalkyldi(alkoxy)silanes and vinyltri(alkoxy)silanes, the alkoxy groups being for example methoxy, ethoxy, methoxyethylene, ethoxyethylene, methoxypropylene glycol ether and/or ethoxypropylene glycol ether moieties. Examples of preferred silane-containing monomers are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyltris(2-methoxyethoxy)silane, vinyltrichorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane and also polyethylene glycol-modified vinylsilanes.

Silane-functional monomers which are most preferred are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane and also mixtures thereof.

Useful silane-functional monomers further include silane group-containing(meth)acrylamides of general formula $CH_2{=}CR^5{-}CO{-}NR^6{-}R^7{-}SiR^8n{-}(R^9)_{3-m}$, where n=0 to 4, m=0 to 2, $R^5$ is either H or methyl, $R^6$ is H or alkyl of 1 to 5 carbon atoms; $R^7$ is alkylene of 1 to 5 carbon atoms or a bivalent organic group in which the carbon chain is interrupted by an oxygen or nitrogen atom, $R^8$ is alkyl of 1 to 5 carbon atoms, $R^9$ is alkoxy of 1 to 40 carbon atoms, which may each be substituted with further heterocycles. Where a monomer contains 2 or more $R^5$ or $R^9$ groups, these may be identical or different.

Examples of such (meth)acrylamidoalkylsilanes are: 3-(meth)acrylamidopropyltrimethoxysilane, 3-(meth)acrylamido-propyltriethoxysilane, 3-(meth)acrylamidopropyltri(β-methoxyethoxy)silane, 2-(meth)acrylamido-2-methylpropyltrimethoxysilane, 2-(meth)acrylamido-2-methylethyltrimethoxysilane, N-(2-(meth)acrylamidoethyl)aminopropyltrimethoxysilane, 3-(meth)acrylamidopropyltriacetoxysilane, 2-(meth)acrylamidoethyltrimethoxysilane, 1-(meth)acrylamidomethyltrimethoxysilane, 3-(meth)acrylamidopropylmethyldimethoxysilane, 3-(meth)acrylamidopropyldimethylmethoxysilane, 3-(N-methyl(meth)acrylamido)propyltrimethoxysilane, 3-((meth)acrylamidomethoxy)-3-hydroxypropyltrimethoxysilane, 3-((meth)-acrylamidomethoxy)propyltrimethoxysilane, N,N-dimethyl-N-trimethoxysilylpropyl-3-(meth)acrylamidopropylammonium chloride and N,N-dimethyl-N-trimethoxysilylpropyl-2-(meth)acrylamido-2-methylpropylammonium chloride.

Said monomers a) are preferably employed in an amount of 0.5 to 60 wt %, more preferably from 1 to 30 wt % and most preferably from 2 to 20 wt %, all based on the overall weight of modified water-soluble polymers.

Monomers b) are preferably selected from the group comprising vinyl esters, (meth)acrylic esters, vinylaromatics, olefins, 1,3-dienes and vinyl halides. (Meth)acrylic esters and vinylaromatics are particularly preferred monomers b).

Useful vinyl esters include, for example, vinyl esters of carboxylic acids having 1 to 22 carbon atoms, in particular 1 to 12 carbon atoms. Preference is given to vinyl acetate, vinyl propionate, vinyl butyrate, vinyl 2-ethylhexanoate, vinyl laurate, vinyl myristate, vinyl palmitate, vinyl stearate, vinyl arachidate, 1-methylvinyl acetate, vinyl pivalate and vinyl esters of α-branched monocarboxylic acids having 9 to 11 carbon atoms, for example VeoVa9$^R$ or VeoVa10$^R$ (Resolution trade names). Vinyl acetate is particularly preferable.

Useful acrylic esters or methacrylic esters include, for example, esters of branched or unbranched alcohols having 1 to 22 carbon atoms, in particular 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, lauryl acrylate, myristyl acrylate, stearyl acrylate, palmityl acrylate, lauryl methacrylate, myristyl methacrylate, stearyl methacrylate or palmityl methacrylate. Particular preference is given to methyl acrylate, methyl methacrylate, n-butyl acrylate, t-butyl acrylate or 2-ethylhexyl acrylate.

Preference for use as vinylaromatics is given to styrene, methylstyrene and vinyltoluene. Vinyl chloride is the preferred vinyl halide. The preferred olefins are ethylene, propylene while the preferred dienes are 1,3-butadiene or isoprene.

The monomers b) are preferably employed in an amount of 5 to 73 wt %, more preferably from 10 to 65 wt % and especially from 20 to 60 wt %, all based on the overall weight of the modified water-soluble polymers.

Optionally, one or more ethylenically unsaturated monomers c) other than said monomers a) and b) may also be employed in the free-radically initiated polymerization for preparing the modified water-soluble polymers.

Examples of monomers c) are ethylenically unsaturated carboxamides and carbonitriles, preferably acrylamide and acrylonitrile; diesters of fumaric acid and maleic acid, such as the diethyl and diisopropyl esters, ethylenically unsaturated sulfonic acids and/or salts thereof, preferably vinylsulfonic acid, 2-acrylamido-2-methylpropanesulfonic acid.

Further examples are precrosslinking comonomers such as polyethylenically unsaturated comonomers, for example diallyl phthalate, divinyl adipate, diallyl maleate, allyl methacrylate or triallyl cyanurate, or postcrosslinking comonomers, for example acrylamidoglycolic acid (AGA), methylacrylamidoglycolic methyl ester (MAGME), N-methylolacrylamide (NMA), N-methylolmethacrylamide, N-methylolallyl carbamate, alkyl ethers such as the isobutoxy ether, or esters of N-methylolacrylamide, of N-methylolmethacrylamide and of N-methylolallyl carbamate. Also suitable are monomers having hydroxyl or CO groups, for example hydroxyalkyl esters of methacrylic acid and of acrylic acid such as hydroxyethyl acrylate, hydroxyethyl methacrylate, hydroxypropyl acrylate, hydroxypropyl methacrylate, hydroxybutyl acrylate or hydroxybutyl methacrylate, and also compounds such as diacetoneacrylamide or acetylacetoxyethyl acrylate or methacrylate.

Said monomers c) are preferably employed at from 0.1 to 10 wt % and more preferably at 0.1 to 5 wt %, all based on the overall weight of the modified water-soluble polymers. What is most preferred is not to employ any monomers c).

The water-soluble polymers generally have an at least 10 g/l solubility in water at a temperature between 20° C. and 90° C. and at a pH between 3 and 12, in particular at a pH between 3 and 9.

Useful water-soluble polymers include, for example, polymers comprising units of vinyl alcohol, vinylpyrrolidones, vinyl acetals, ethylenically unsaturated carboxylic acids, acrylamides, vinylsulfonic acids, ethylenically unsaturated amines or ammonium compounds or else polymers such as polysaccharides in water-soluble form, proteins, ligninsulfonates or formaldehydesufonates.

Preferred water-soluble polymers are polyvinyl alcohols; polyvinyl acetals; polyvinylpyrrolidones; polysaccharides in water-soluble form such as starches (amylose and amylopectin), celluloses and their carboxymethyl, methyl, hydroxyethyl and/or hydroxypropyl derivatives, dextrins and cyclodextrins; proteins such as casein or caseinate, soyprotein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamineformaldehydesulfonates, naphthaleneformaldehydesulfonates, cresolformaldehydesulfonates, styrene-maleic acid copolymers, and vinyl ether-maleic acid copolymers.

Preferred polyvinyl alcohols further include polyvinyl alcohols comprising hydrophobic monomer units, for example hydrolyzed copolymers of vinyl acetate with hydrophobic comonomers such as isopropenyl acetate, vinyl pivalate, vinyl ethylhexanoate, vinyl esters of saturated alpha-branched monocarboxylic acids of 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of hydrophobic monomer units is preferably in the range from 0.1 to 10 wt %, based on the overall weight of the particular polyvinyl alcohol.

The polyvinyl alcohols may also concern cationic polyvinyl alcohols or anionic polyvinyl alcohols. Cationic protective colloids are polymers having a cationic charge; anionic protective colloids are polymers having an anionic charge.

Examples of cationic polyvinyl alcohols are polymers containing cationic monomer units, preferably monomer units having quaternary ammonium groups, sulfonium groups and phosphonium groups. Preference is given to hydrolyzed copolymers of vinyl acetate with one or more cationic comonomers selected from the group comprising allylalkylammonium halides, (meth)acryloyloxyalkylammonium halides, (meth)acrylamidoalkyl-ammonium halides, aminoalkyl (meth)acrylate and aminoalkyl-(meth)acrylamide, where the alkyl radicals may contain 1 to 4 carbon atoms. Preferred cationic comonomers are selected from the group comprising diallyldiethylammonium chloride (DADEAC), (3-methacryloyloxy)-propyltrimethylammonium chloride (MPTAC), (3-methacryloyloxy)-ethyltrimethylammonium chloride (METAC), (3-methacrylamido)-propyltrimethylammonium chloride (MAPTAC), 2-dimethylamino-ethyl methacrylate or 3-dimethylaminopropyl-methacrylamide (DMAEMA or DMAPMA are protonated species at pH ≤5) and especially diallyldimethylammonium chloride (DADMAC). Most preferred monomers c) are diallyldimethyl-ammonium chloride (DADMAC), diallyldiethylammonium chloride (DADEAC), (3-methacryloyloxy)propyltrimethylammonium chloride (MPTAC), (3-methacryloyloxy)ethyltrimethylammonium chloride (METAC), (3-methacrylamido)propyltrimethylammonium chloride (MAPTAC). The preparation of cationic polyvinyl alcohols is described, for example, in EP1724288A1 or in E. W. Flick, Water-Soluble Resins—an Industrial Guide, Noyes Publications, Park Ridge, N.J., 1991.

The proportion of cationic comonomers is preferably 0.01% to 30% by weight, more preferably 1% to 15% by weight, yet more preferably 1% to 10% by weight and most preferably 1% to 5% by weight, all based on the overall weight of the cationic polyvinyl alcohols.

Examples of anionic polyvinyl alcohols are polymers containing anionic monomer units, preferably monomer units having sulfate, sulfonic acid, phosphate, phosphonate and carboxylic acid groups or the respective salts thereof. Particularly preferred anionic monomer units bear phosphate, phosphonate or especially sulfonic acid or carboxylic acid groups. Preference is given to hydrolyzed copolymers of vinyl acetate with one or more anionic comonomers selected from the group comprising vinyl sulfonates, allyl sulfonates, ethylenically unsaturated mono- or dicarboxylic acids, monoesters of fumaric acid and maleic acid. Particular preference is given to vinyl sulfonates and ethylenically unsaturated mono- or dicarboxylic acids. Especially preferred are vinyl sulfonate, 2-methyl-2-propene-1-sulfonic acid, allyl sulfonate, acrylic acid, methacrylic acid, fumaric acid, maleic acid, monoethyl or monoisopropyl esters of fumaric acid or of maleic acid, or the salts of the aforementioned acids. Most preferred is vinyl sulfonate. The preparation of anionic polyvinyl alcohols is described, for example, in WO06122705A.

The proportion of anionic comonomers is preferably 0.01% to 30% by weight, more preferably 1% to 20% by weight, yet more preferably 1% to 15% by weight and most preferably 1% to 10% by weight, all based on the overall weight of the anionic polyvinyl alcohols.

Preference is given to partly hydrolyzed or fully hydrolyzed polyvinyl alcohols having a hydrolysis level of 80 to 100 mol %, especially partly hydrolyzed polyvinyl alcohols having a hydrolysis level of 80 to 95 mol %. The hydrolysis level refers to the molar ratio of the vinyl alcohol units and the sum total of the vinyl alcohol and vinyl esters units of the respective water-soluble polymer c).

The polyvinyl alcohols have a Höppler viscosity of preferably 0.4 to 30 mPas, more preferably 0.4 to 15 mPas, even more preferably of 0.5 to 10 mPas and most preferably of 0.8 to 6 mPas (determined by the Höppler method at 20° C. to DIN 53015 in 4% aqueous solution).

Polyvinyl acetals are obtainable by partial or full acetalization of the partly or fully hydrolyzed polyvinyl alcohols. The polyvinyl acetals are prepared by standard methods, by acetalizing the polyvinyl alcohols mentioned with aldehydes, as described, for example, in DE-A 10140131. Preference is given to aldehydes from the group of the aliphatic aldehydes having 1 to 15 carbon atoms, especially formaldehyde, acetaldehyde, propionaldehyde and most preferably butyraldehyde or a mixture of butyraldehyde and acetaldehyde. Aromatic aldehydes used may, for example, be benzaldehyde or derivatives thereof. The acetalization level of the polyvinyl acetals can be adjusted via the amount of aldehyde used. This is because, since the acetalization proceeds with almost complete conversion, the amount added can be determined by simple stoichiometric calculation.

Particularly preferred water-soluble polymers are polyvinyl alcohols, including in particular cationic polyvinyl alcohols or anionic polyvinyl alcohols.

To prepare the modified water-soluble polymers by chain growth addition polymerization, the water-soluble polymers are employed at preferably from 25 to 80 wt %, more preferably at from 30 to 70 wt % and most preferably at from 35 to 60 wt %, all based on the overall weight of the modified water-soluble polymers.

During said polymerization for preparing the modified water-soluble polymers, the water-soluble polymers become grafted with, in general, monomer units of monomers a) and/or b) and/or optionally c). Grafting is to be understood as meaning that units of ethylenically unsaturated monomers become attached to the water-soluble polymers via covalent bonds.

The polymer units based on said monomers a), b) and optionally c) of the modified water-soluble polymers have volume average particle sizes of preferably 10 nm to 200 nm, more preferably of from 30 nm to 180 nm and most preferably of from 40 nm to 130 nm (as determined using a BeckmanCoulter LS 13320 (PIDS)). These particle sizes are particularly advantageous with regard to the stronger adherence of crosslinked modified water-soluble polymers to substrates.

The modified water-soluble polymers are obtainable, for example, by the ethylenically unsaturated monomers of the present invention being made to undergo an emulsion polymerization in the presence of one or more water-soluble polymers. It is thus preferably not a suspension polymerization which takes place. The polymerization temperature is preferably between 40° C. and 100° C., more preferably between 60° C. and 90° C. The copolymerization of gaseous comonomers such as ethylene, 1,3-butadiene or vinyl chloride can also be carried out under superatmospheric pressure, in general between 5 bar and 100 bar. The pH during the polymerization is preferably between 2 and 11. When epoxy-bearing monomers a) are employed, the pH during the polymerization is preferably between 4 and 9, more preferably between 4 to 8 and most preferably between 6 and 7. The pH may be established in the known manner using both organic and inorganic acids, bases or buffers, as for example by addition of hydrochloric acid, ammonia or alkaline earth and/or alkali metal hydroxides, for example aqueous sodium hydroxide solution.

The polymerization is typically carried out in water, optionally mixed with one or more organic solvents, such as alcohols of 1 to 7 carbon atoms. Examples of alcohols are methanol, ethanol, propanol, butanol or pentanol. The proportion of water, based on the combined weight of the organic solvents and water, is preferably ≥50 wt %, more preferably ≥90 wt % and most preferably 100 wt %.

The polymerization may be initiated, for example, by means of monomer-soluble initiators, in particular water-soluble initiators or else redox-initiator combinations, customary for the emulsion polymerization process; preferably, redox-initiator combinations are eschewed. Examples of water-soluble initiators are hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Examples of monomer-soluble initiators are dicetyl peroxydicarbonate, dicyclohexyl peroxydicarbonate, dibenzoyl peroxide or preferably alkali or alkaline earth metal or ammonium salts, such as sodium, potassium and ammonium salts, of peroxydisulfuric acid.

The waterfastness of the modified water-soluble polymers and/or of their in-service products is further enhanceable particularly by employment of peroxydisulfuric acid or salts thereof as an initiator.

The recited initiators are generally employed in an amount of 0.1 to 5.0 wt %, preferably 0.2 to 2.0 wt %, all based on the overall weight of the monomers.

Preferably ≥20 wt %, more preferably ≥30 wt %, yet more preferably ≥40 wt % and yet still more preferably ≥50 wt % of the initiators is initially charged while the remaining portion of the initiators is metered in during the polymerization, based on the overall weight of the initiators. The proportion of the overall weight of the initiators which is metered in during the polymerization is preferably ≤80 wt %, more preferably ≤60 wt % and yet more preferably ≤10 wt %. Most preferably, no initiators are metered in during the polymerization, i.e., the initiators are fully included in the initial charge. On completion of the addition of the monomers, however, additional amounts of initiators may be added to complete the polymerization. The initial charging and/or metering of the initiators in the manner of the present invention likewise serves to improve the waterfastness of the modified water-soluble polymers and/or of their in-service products. In addition, the particle size or the viscosity of the modified water-soluble polymers is controllable in this manner.

Useful redox initiators include combinations formed from the recited initiators and reducing agents. Useful reducing agents include, for example, the sulfites and bisulfites of the alkali metals and of ammonium, such as sodium sulfite, the derivatives of sulfoxylic acid such as zinc or alkali metal formaldehydesulfoxylates, such as sodium hydroxymethanesulfinate, and ascorbic acid. The amount of reducing agent is generally in the range from 0.001 to 0.03 wt %, preferably from 0.001 to 0.015 wt %, all based on the overall weight of the monomers.

The water-soluble polymers may be wholly or partly metered in or, preferably, initially charged in full. The proportion of the water-soluble polymers which is initially charged is preferably not less than 50 wt %, more preferably not less than 60 wt % and most preferably not less than 80 wt %, all based on the amount of water-soluble polymers which is used overall.

Preferably ≥50 wt %, more preferably ≥60 wt %, yet more preferably ≥70 wt % and most preferably ≥80 wt % of the amount of water-soluble polymers which is used overall will have been initially charged or metered in by the time ≤60 wt %, preferably ≤50 wt %, more preferably ≤40 wt % and most preferably ≤30 wt % of the altogether employed amounts of monomers a) and b) has been initially charged or metered in.

Said monomers a) and b) may be initially charged in their entirety or specifically fully metered in. The proportion of monomers a) and b) which is metered in is preferably from 0 to 20 wt %, in particular from 0 to 10 wt %, based on the overall weight of the altogether employed amounts of monomers a) and b), while the remainder of monomers a) and b) is metered in at a later stage during the polymerization, in particular at a stage where ≥50 wt %, preferably ≥60 wt %, more preferably ≥70 wt % and most preferably ≥80 wt % of the amount of water-soluble polymers which is employed overall will have been initially charged or metered in. The metered additions may be carried out separately (in time and/or place).

The preferred metered addition and, respectively, the initial charging of said monomers b) and especially a) or of the water-soluble polymers are particularly useful for improving the crosslinking properties of the modified water-soluble polymers or for enhancing the waterfastness of their in-service products.

Emulsifiers may be additionally present during the polymerization. When the polymerization is carried out in the presence of emulsifiers, their amount is preferably in the range from 1 to 5 wt % based on the weight of monomers a) and b). Preference is given to polymerizing in the absence of emulsifiers. Examples of emulsifiers are anionic, cationic, amphoteric, polymerizable or nonionic emulsifiers, such as anionic surfactants, in particular alkyl sulfates having a chain length of 8 to 18 carbon atoms, alkyl or alkylaryl ether sulfates having 8 to 18 carbon atoms in the hydrophobic moiety and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

To control the molecular weight and/or the viscosity, chain transfer agents may be employed during the polymerization. When chain transfer agents are employed, they are typically employed in amounts between 0.01 to 5.0 wt %, based on said monomers a) and optionally b) to be polymerized, and are metered in separately or else in a premix with reaction components. Examples of chain transfer agents are n-dodecyl mercaptan, tert-dodecyl mercaptan, mercaptopropionic acid, methyl mercaptopropionate, isopropanol and acetaldehyde.

The modified water-soluble polymers are preferably present in water or in a mixture of water and organic solvent, in particular at a solids content of 5% to 60%, preferably 10% to 50% and more preferably 15% to 45%. The viscosities of the modified water-soluble polymers are very greatly dependent on the water-soluble polymers employed for their preparation, allowing the preparation of modified water-soluble polymers in a very wide range of viscosities.

Aqueous dispersions or aqueous solutions of the modified water-soluble polymers are notable for a high level of stability. This manifests itself, for example, in the inability to separate the modified water-soluble polymers in aqueous form into a polymer phase and a serum by centrifuging for one hour with an ultracentrifuge (Optimal L-100k from Beckman Coulter) under standard conditions to DIN50014 at 40,000 revolutions per minute—unlike the known protective colloid-stabilized polymers of ethylenically unsaturated monomers.

To prepare the modified water-soluble polymers in the form of solids, in particular in the form of powders, modified water-soluble polymers in the form of dispersions or solutions may be freed of water and any solvent in a known manner, for example using precipitation, distillation or drying, in particular by fluidized bed drying, freeze drying or spray drying. The modified water-soluble polymers are preferably dried without addition of drying assistants, i.e., preferably without the abovementioned water-soluble polymers being added after conclusion of the polymerization for preparing the modified water-soluble polymers, and in particular without the water-soluble polymers being added during drying. The dispersions are preferably spray-dried. This spray drying is carried out in customary spray drying equipment, and atomization may be effected using one-, two- or multi-material nozzles or with a rotating disk. The exit temperature is generally chosen within the range from 45° C. to 120° C., preferably from 60° C. to 90° C.

Modified water-soluble polymers are thereby obtainable in the form of water-thinnable or water-redispersible powders.

To enhance the storability by improving the blocking resistance, the powder obtained may be additized with antiblocking agents (anticaking agents). The modified water-soluble polymers in the form of powders preferably contain from 2 to 10 wt % of antiblocking agent, based on the dry weight of the modified water-soluble polymers. However, it is particularly preferable to eschew the addition of antiblocking agents. Examples of antiblocking agents are calcium carbonate, magnesium carbonate, talcum, gypsum, silica, kaolins, metakaolin, calcined kaolin, silicates having particle sizes preferably in the range from 10 nm to 100 µm.

In one preferred embodiment, one or more modified water-soluble polymers are present as a constituent of a crosslinking agent composition additionally containing one or more components from the group comprising base polymers, epoxy components, hardeners and additives.

To prepare the crosslinking agent composition, the modified water-soluble polymers and the further component of the crosslinking agent composition are mixed in manner commonly used in the present field of the invention.

The base polymers are based on one or more ethylenically unsaturated monomers, for example as selected from the group comprising the abovementioned monomers a), b) and c), the same monomers being preferable, more preferable and most preferable as indicated above. Such base polymers are also known as film-forming polymers.

Examples of homo- or copolymers useful as base polymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers.

Preference is given to vinyl acetate homopolymers; copolymers of vinyl acetate with from 1 to 40 wt % of ethylene; copolymers of vinyl acetate with from 1 to 40 wt % of ethylene and from 1 to 50 wt % of one or more further comonomers from the group of vinyl esters having 1 to 12 carbon atoms in the carboxylic acid moiety such as vinyl propionate, vinyl laurate, vinyl esters of alpha-branched carboxylic acids having 5 to 13 carbon atoms such as VeoVa9R, VeoVa10R, VeoVa11R; copolymers of vinyl acetate, from 1 to 40 wt % of ethylene and preferably from 1 to 60 wt % of acrylic ester of branched or unbranched alcohols having 1 to 15 carbon atoms, in particular n-butyl acrylate or 2-ethylhexyl acrylate; and copolymers comprising from 30 to 75 wt % of vinyl acetate, from 1 to 30 wt % of vinyl laurate or vinyl ester of an alpha-branched carboxylic acid having 5 to 13 carbon atoms, and also from 1 to 30 wt % of acrylic ester of branched or unbranched alcohols having 1 to 15 carbon atoms, in particular n-butyl acrylate or 2-ethylhexyl acrylate, which may each further comprise from 1 to 40 wt % of ethylene; copolymers comprising vinyl acetate, from 1 to 40 wt % of ethylene and from 1 to 60 wt % of vinyl chloride; subject to the proviso that the polymers may each further comprise the recited comonomers in the recited amounts, and the particulars in wt % always add up to 100 wt %.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group methyl acrylate, ethyl acrylate, propyl acrylate, n-butyl acrylate, 2-ethylhexyl acrylate; vinyl acetate-acrylic ester copolymers with one or more monomers from the group methyl acrylate, ethyl acrylate, propyl acrylate, n-butyl acrylate, 2-ethylhexyl acrylate and optionally ethylene; styrene-1,3-butadiene copolymers; subject to the proviso that the polymers may each further comprise the recited comonomers in the recited amounts, and the particulars in wt % always add up to 100 wt %.

The monomers and/or the weight fractions for the comonomers are selected so as to obtain in general a glass transition temperature Tg of −50° C. to +50° C., preferably −30° C. to +40° C. The glass transition temperature Tg of polymers is quantifiable in a known manner by Differential Scanning calorimetry (DSC). Tg is also approximatable in advance via the Fox equation. According to Fox T. G., Bull. Am. Physics Soc. 1, 3, page 123 (1956): $1/Tg=x1/Tg1+x2/Tg2+\ldots+xn/Tgn$, where xn represents the mass fraction (wt %/100) of monomer n and Tgn represents the glass transition temperature in kelvins of the homopolymer of monomer n. Tg values of homopolymers are reported in the Polymer Handbook 2nd Edition, J. Wiley & Sons, New York (1975).

The base polymers are obtainable by free-radically initiated polymerization of ethylenically unsaturated monomers as for example described in DE-A 102006050336, preferably by emulsion polymerization processes in an aqueous medium.

The base polymers may, for example, be emulsifier stabilized or preferably protective colloid stabilized. Useful protective colloids include, for example, the abovementioned water-soluble polymers, or the modified water-soluble polymers of the present invention. Useful emulsifiers are recited above by way of example. The emulsion polymerization processes for preparing the base polymers are preferably effected in the presence of protective colloids, more preferably in the absence of the modified water-soluble polymers. In protective colloid-stabilized base polymers, the protective colloids and the base polymers are generally present side by side.

The polymerization generally generates the base polymers in the form of aqueous dispersions. To prepare the base polymers in the form of water-redispersible powders, the aqueous dispersions are dried, optionally after addition of drying assistants, for example the abovementioned water-soluble polymers, preferably the modified water-soluble polymers. The methods described above for drying the modified water-soluble polymers may find application here. In general, the drying aid is employed in an overall amount of 3 to 30 wt %, based on the polymeric constituents of the dispersion. Preference is given to employing from 5 to 20 wt % based on the polymer content.

The use of polymer blends as crosslinking assistants is also preferable. Polymer blends contain one or more modified water-soluble polymers and one or more base polymers, in particular one or more protective colloid-stabilized base polymers. Preferred polymer blends contain with preference from 2 to 95 wt %, more preferably from 5 to 50 wt % and most preferably from 5 to 30 wt % of modified water-soluble polymers, each based on the dry weight of the polymer blend. Preferred polymer blends also contain with preference from 5 to 98 wt %, more preferably from 50 to 95 wt % and most preferably from 70 to 95 wt % of protective colloid-stabilized base polymers, each based on the dry weight of the polymer blend. The polymer blends are preferably in the form of aqueous dispersions and more preferably in the form of water-redispersible powders.

The modified water-soluble polymers are incorporable in the polymer blends in various ways. For example, protective colloid-stabilized base polymers and modified water-soluble polymers may each be mixed in solid form or each be mixed in aqueous form. It is further also possible to mix either the protective colloid-stabilized base polymers or the modified water-soluble polymers in solid form and whichever is the other of the two components referred to in aqueous form. Preferably, the modified water-soluble polymers are added, in particular in their aqueous form, to the aqueous protective colloid-stabilized base polymer dispersions before and/or during drying.

Epoxy components are, for example, synthetic resins bearing epoxy groups, generally polyethers having two or more epoxy groups, in particular two terminal epoxy groups. Epoxy components are commonly polycondensates, in particular of polyhydric monomeric alcohols and chlorine—as well as epoxy-functional monomers. The epoxy compounds may be aliphatic, araliphatic or aromatic in nature. The epoxy components preferably do not bear any free-radically polymerizable groups, such as ethylenically unsaturated groups. Examples are epoxy compounds of the bisphenol A type, i.e., condensation products of bisphenol A and epichlorohydrin or methylepichlorohydrin. Also suitable are epoxy compounds based on bisphenol F, which generally comprise a mixture of bisglycidyloxyphenylmethanes. Further examples are aliphatic epoxy compounds such as glycidyl ethers of aliphatic polyols, in particular butyl diglycidyl ether or trimethylolpropane triglycidyl ether; cycloaliphatic epoxy resins such as vinylcyclohexane dioxide, dicyclopentadiene dioxide and 3,4-epoxy-6-methylcyclohexylmethyl; and heterocyclic epoxy compounds such as triglycidyl isocyanurate. Epoxy resins of this type are commercially available, for example the bisphenol A and bisphenol F types as Epilox$^R$ resins. The epoxy resins of the bisphenol A type and bisphenol F type are preferred and glycidyl ethers of aliphatic polyols are particularly preferred.

The epoxy components are employed in an amount of preferably 2 to 70 wt %, more preferably 4 to 50 wt %, all based on the dry weight of the modified water-soluble polymers.

Preference is also given to the use of blends with epoxy components as crosslinking assistants. Blends of this type contain one or more modified water-soluble polymers, one or more epoxy components and optionally one or more base polymers, in particular one or more protective colloid-stabilized base polymers. Preferred blends with epoxy components contain with preference from 5 to 70 wt %, more preferably from 5 to 50 wt % and most preferably from 10 to 50 wt % of modified water-soluble polymers; preferably from 5 to 90 wt %, more preferably from 5 to 70 wt % and most preferably from 10 to 70 wt % of epoxy components; optionally from 0 to 95 wt % and preferably from 5 to 90 wt % of protective colloid-stabilized base polymers, with the proviso that the particulars in wt % are each based on the dry weight of the blends with epoxy components and add up to 100 wt % in total. The blends with epoxy components are preferably in the form of aqueous dispersions and more preferably in the form of water-redispersible powders.

The blends with epoxy components are obtainable by mixing the individual constituents of the blends in various ways. For example, the epoxy components, the modified water-soluble polymers and optionally the base polymers are each employable in solid form for the mixing or each in aqueous form. It is further also possible for one or more components of a blend with epoxy components to be used for mixing in solid form with the remaining components in aqueous form. The epoxy components are preferably employed as pure substance. Preferably, the modified water-soluble polymers and/or the epoxy components are mixed after the preparation of the base polymers by chain growth addition polymerization and more preferably before and/or during the drying of the aqueous base polymer dispersions.

Hardeners hasten the crosslinking of the modified water-soluble polymers and/or of the optional epoxy components and enable said crosslinking to take place at higher crosslinking rates, even at comparatively low temperatures. Preferred hardeners are selected from the group comprising amines and silanes, in particular aminosilanes or epoxysilanes.

Preferred amines have two or more amino groups, for example aliphatic polyamines, polyoxyalkyleneamines, polyethyleneimines, aminosilanes and their condensation products, amino-functional polyvinyl alcohols. Particularly preferred amines are aliphatic polyamines, which are available under the trade names of Anquamine$^R$/Epilink$^R$ or Epilox$^R$ hardeners, or polyoxyalkyleneamines, which are available under the trade names of Jeffamine$^R$, or polyethyleneimines, which are available under the trade name of Polyimin.

Preference is also given to aminosilanes and condensation products thereof. Useful aminosilanes include, for example, those available under the trade name of Geniosil$^R$, such as N-(2-aminoethyl) (3-aminopropyl)trimethoxysilane (Geniosil GF 91), (3-aminopropyl)triethoxysilane (Geniosil GF 93), N-(2-aminoethyl) (3-aminopropyl)methyldimethoxysilane (Geniosil GF 95).

Preferred epoxysilanes are (3-glycidoxypropyl) trimethoxysilane and especially (3-glycidoxypropyl)triethoxysilane.

The hardener blends are preferably in the form of aqueous dispersions and more preferably in the form of water-redispersible powders.

It is preferable to align the amount of hardener with the molar ratio of monomer units a) of the modified water-soluble polymers and the functional groups of the hardener, in particular the amino or epoxy groups of the hardener. It is accordingly also particularly preferable to employ the modified water-soluble polymers and the hardeners in such a quantitative ratio that the molar ratio of monomer units a) to the functional groups of the hardener is in the range from 0.5 to 2.0.

The hardenable blends are obtainable by mixing their individual constituents in various ways. The hardeners are incorporable, for example, as pure substance or applied to supports, such as calcium carbonate, silicates or zeolites, or in encapsulated form, for example in organic or inorganic encapsulation materials. The hardeners are preferably employed as pure substance. For example, the hardeners, the modified water-soluble polymers, optionally the epoxy components and optionally the base polymers are mixable with each in solid form or each in aqueous form. It is further also possible to mix one or more components of a hardener blend in solid form while the remaining components are in aqueous form. Preferably, the hardeners and the further constituents of the hardener blends are only mixed before their application, preferably immediately before their application. It is particularly preferable to add hardeners to aqueous dispersions comprising modified water-soluble polymers and epoxy components and/or base polymers, in particular protective colloid-stabilized base polymers.

To improve the performance characteristics, the crosslinking agent composition, the polymer blends, the blends with epoxy components or the hardener blends may contain further additives, for example fillers, pigments, plasticizers, foam stabilizers, flame retardants, hydrophobicizing agents, oils or further polymers, such as polyurethanes or polysiloxanes. Additives of this type may be included in the amounts customary therefor, for example at from 0.1 to 90 wt %, preferably at from 2 to 50 wt % and more preferably at from 2 to 10 wt %, based on the dry weight of the particular composition or blend. Most preferably, no additives are included.

To serve as a crosslinking assistant, the modified water-soluble polymers and/or the crosslinking agent composition, the polymer blends, the blends with epoxy components or the hardener blends are applied to a substrate, generally in liquid or pasty form, in particular as an aqueous mixture. The crosslinking generally occurs in the course of the filming of the polymers. Crosslinking is to be understood as meaning that particularly monomer units a) of the modified water-soluble polymers react with polymers and the optionally added other constituents of the applied composition or with the substrate to form a network.

The crosslinking of the modified water-soluble polymers may advantageously be effected at a very wide variety of temperatures, for example at from 2° C. to 200° C., more preferably at from 15° C. to 160° C. When the crosslinking of the modified water-soluble polymers takes place in the absence of hardeners, the temperatures for this are preferably in the range from 90° C. to 200° C. and more preferably in the range from 130° C. to 160° C. Crosslinking at temperatures below 30° C. generally takes several days, for example a week. Above 100° C., especially above 125° C., crosslinking takes a few minutes, for example from 1 to 10 minutes and especially from 2 to 5 minutes.

The crosslinking agents of the present invention are employable in the typical fields of use for crosslinking agents, being useful in general as crosslinking agents for coatings or adhesives, as, for example, for woven or nonwoven textiles, fibers or paper. Particular preference is given to the employment as crosslinking agents in the manufacture of paper coatings, in particular for thermal and inkjet papers, or for coating organic and inorganic fibers.

Possible usages for the modified water-soluble polymers are further in chemical products for civil engineering, optionally in conjunction with mineral binders such as cements (portland cement, aluminate cement, trass cement, foundry cement, magnesia cement, phosphate cement), gypsum and waterglass, in the manufacture of civil engineering adhesives, in particular tile adhesives and integrated thermal insulation adhesives, renders, spackling compounds, floor screeds, leveling compounds, sealing compounds, jointing mortars, primers, water vapor barriers and paints.

The modified water-soluble polymers of the present invention surprisingly crosslink into products having soil-resistant properties and having the desired waterfastness. Not unconnectedly, the extractability of water-soluble constituents from the crosslinked products is correspondingly reduced, counteracting the appearance of efflorescence. Crosslinked modified water-soluble polymers are notable for a very low level of water imbibition. The modified water-soluble polymers are free from specks; shear and shelf stable; water redispersible in the uncrosslinked state; and waterfast after crosslinking. Advantageously, employing the modified water-soluble polymers of the present invention as crosslinking assistants makes it possible to eschew the use of harmful hardeners, such as formaldehyde-evolving hardeners.

The examples which follow serve to further elucidate the invention:

Preparation of Modified Water-Soluble Polymers

Solids Content:

Determination as per DIN EN ISO 3251 in drying cabinet for 20 min at 150° C.

Höppler Viscosity:

Determination at 20° C. as per DIN 53015 in 4% aqueous solution.

Brookfield Viscosity:

Determination with a Brookfield viscometer, after conditioning to 23° C., by use of spindle 1 or 2 at 20 revolutions per minute. The particular spindle, solvent and solids content used are reported for each measurement.

Volume Average Particle Size:

Determination using Beckmann Coulter BeckmanCoulter LS 13320 (PIDS).

EXAMPLE 1 (Ex. 1)

A thermostated laboratory reactor having a capacity of 3.0 liters and a nitrogen atmosphere was initially charged with 1002 g of a 20% aqueous polyvinyl alcohol solution (Mowiol 4-88, trade name of Kuraray, Höppler viscosity 4 mPas, hydrolysis level 88) and 1196 g of water containing 1.1 g of potassium peroxodisulfate (KPS) before heating to 80° C. under agitation. On reaching 80° C., a monomer mixture formed from 113 g of butyl acrylate and 113 g of styrene was metered into the reactor in a continuous manner in the course of 70 minutes. On completion of the addition of the monomer mixture, 75.3 g of glycidyl methacrylate (GMA) from a separate container were added into the reactor in a continuous manner in the course of 30 minutes. On completion of the addition of GMA, the resulting reaction mixture was cooled down to room temperature in the course of one hour. During the cooling phase, two lots of 4 g of tert-butyl hydroperoxide (10% in water) and 4 g of ascorbic acid (10% in water) at a time were added to complete the polymerization.

The polymer dispersion thus obtained had a solids content of 20.2%, a pH 7 Brookfield viscosity of 147 mPa·s (spindle 1) and a volume average particle size of 87 nm.

EXAMPLE 2 (Ex. 2)

A thermostated laboratory reactor having a capacity of 3.0 liters and a nitrogen atmosphere was initially charged with 752 g of a 20% aqueous polyvinyl alcohol solution (Mowiol 4-88) and 1396 g of water containing 0.8 g of potassium peroxodisulfate (KPS) before heating to 80° C. under agitation. On reaching 80° C., a monomer mixture formed from 137.8 g of butyl acrylate and 137.8 g of styrene was metered into the reactor in a continuous manner in the course of 85 minutes. On completion of the addition of the monomer mixture, 75.3 g of glycidyl methacrylate (GMA) from a separate container were added into the reactor in a continuous manner in the course of 30 minutes. On completion of the addition of GMA, the resulting reaction mixture was cooled down to room temperature in the course of one hour. During the cooling phase, two lots of 4 g of tert-butyl hydroperoxide (10% in water) and 4 g of ascorbic acid (10% in water) at a time were added to complete the polymerization.

The polymer dispersion thus obtained had a solids content of 20.1%, a pH 7 Brookfield viscosity of 56 mPa·s (spindle 1) and a volume average particle size of 80 nm.

EXAMPLE 3 (Ex. 3)

A thermostated laboratory reactor having a capacity of 3.0 liters and a nitrogen atmosphere was initially charged with 1002 g of a 20% aqueous polyvinyl alcohol solution (Mowiol 4-88) and 1196 g of water containing 1.1 g of potassium peroxodisulfate (KPS) before heating to 80° C. under agitation. On reaching 80° C., a monomer mixture formed from 144.5 g of butyl acrylate, 144.5 g of styrene and 15 g of vinyl triethoxysilane was metered into the reactor in a continuous manner in the course of 70 minutes. On completion of the addition of the monomer mixture, the polymerization was continued for one hour. After that, the resulting reaction mixture was cooled down to room temperature in the course of one hour. During the cooling phase, two lots of 4 g of tert-butyl hydroperoxide (10% in water) and 4 g of ascorbic acid (10% in water) at a time were added to complete the polymerization.

The polymer dispersion thus obtained had a solids content of 20.1%, a pH 5 Brookfield viscosity of 160 mPa·s (spindle 1) and a volume average particle size of 89 nm.

COMPARATIVE EXAMPLE 4 (CEx. 4)

A thermostated laboratory reactor having a capacity of 3.0 liters and a nitrogen atmosphere was initially charged with 502.6 g of a 20% aqueous polyvinyl alcohol solution (Mowiol 4-88) and 1595 g of water containing 0.8 g of potassium peroxodisulfate (KPS) before heating to 80° C. under agitation. On reaching 80° C., a monomer mixture formed from 137.8 g of butyl acrylate and 137.8 g of styrene was metered into the reactor in a continuous manner in the course of 85 minutes. On completion of the addition of the monomer mixture, 75.3 g of glycidyl methacrylate (GMA) from a separate container were added into the reactor in a continuous manner in the course of 30 minutes. On completion of the addition of GMA, the resulting reaction mixture was cooled down to room temperature in the course of one hour. During the cooling phase, two lots of 4 g of tert-butyl hydroperoxide (10% in water) and 4 g of ascorbic acid (10% in water) at a time were added to complete the polymerization.

The polymer dispersion thus obtained had a solids content of 20.3%, a pH 7 Brookfield viscosity of 32 mPa·s (spindle 1) and a volume average particle size of 110 nm.

Testing of Redispersion Behavior of Polymer Films Based on Modified Water-Soluble Polymers:

The dispersions of the examples and comparative example were each applied to a glass plate; polymer films 0.2 mm in thickness were obtained after application of the following drying conditions:

24h RT:
    drying for 24 hours under normal conditions to DIN50014;

24h RT, 3 min 150° C.:
    drying for 24 hours under normal conditions to DIN50014;
    then additionally for 3 minutes in drying cabinet at 150° C.

The polymer films thus obtained were tested for redispersibility by pipetting one water droplet at a time onto a homogeneous spot of the in-test polymer film under normal conditions as per DIN50014, and after being in contact with the water droplet for 60 seconds, the same spot was rubbed with the fingertip until the film at this spot was either redispersed in water or, in the event that no redispersion took place, had fragmented.

Polymer film redispersibility was evaluated against the following grading scheme:

grade 1: film is immediately redispersible by gentle rubbing, or even redisperses of its own accord;
grade 2: film is redispersible by rubbing;
grade 3: film is only partly redispersible by vigorous rubbing; unredispersible fragments remain;
grade 4: film is unredispersible even by prolonged vigorous rubbing, fragmenting instead.

TABLE 1

Redispersibility of polymer films from modified water-soluble polymers:

| Polymer | PVOH content[a] | Redispersibility of polymer films | |
| --- | --- | --- | --- |
| | | 24 h RT | 24 h RT, 3 min 150° C. |
| Ex. 1 | 40% | 1 | 4 |
| Ex. 2 | 30% | 2 | 4 |
| Ex. 3 | 40% | 1 | 3 |
| CEx. 4 | 20% | 4 | 4 |

[a]content of polyvinyl alcohol in wt %, based on dry weight of modified water-soluble polymer.

The testing shows that inventive polymer films dried at room temperature for one day are readily redispersible in water at room temperature, in contrast to the polymer film of Comparative Example 4. Yet when dried at elevated temperature, even the inventive polymer films were not to any significant extent redispersible despite their high content of water-soluble polymers.

Testing of Redispersion Behavior of Polymer Films Based on Modified Water-Soluble Polymers and Hardeners:

The polymer dispersions of the examples and comparative example were each mixed 50 g at a time with the amounts reported in table 2 for the particular hardener, under normal conditions according to DIN50014. The mixtures thus obtained were then each applied to a glass plate; polymer films 0.2 mm in thickness were obtained after application of the following drying conditions:

1w RT:
    drying for 1 week under normal conditions to DIN50014;

1w RT, 3 min 150° C.:
    drying for 1 week under normal conditions to DIN50014; then additionally for 3 minutes in drying cabinet at 150° C.

The polymer films thus obtained were graded for redispersibility on the scale from 1 to 4 as per the scheme defined above. The test results are summarized in table 2.

TABLE 2

Redispersibility of polymer films from modified water-soluble polymers and hardeners:

| Polymer | Hardener | Redispersibility of polymer film | |
| --- | --- | --- | --- |
| | | 1 w RT | 1 w RT, 3 min 150° C. |
| Ex. 1 | 1.2 g Jeffamine T-403[a] | 4 | 4 |
| Ex. 3 | 0.3 g Silan GF 82[b] | 1-2 | 3-4 |

[a]polyetheramine from Huntsman;
[b](3-glycidoxypropyl)triethoxysilane) from Wacker Chemie.

Hardeners generally lead to stronger/faster crosslinking of the modified water-soluble polymers. The test results for the polymer of Example 1 and Jeffamine T-403 show that water-impervious polymer films are obtainable even after just room temperature drying by additionally employing a hardener.

Preparation of Polymer Dispersion (Base Polymer):

A polymerization vessel having a capacity of 12 liters was initially charged with 2230 g of water, 2380 g of a 20% aqueous solution of a polyvinyl alcohol having a hydrolysis level of 88 mol % and a Höppler viscosity of 4 mPas, 10 g of iron ammonium sulfate (1% in water) and also 1050 g of butyl acrylate and 617 g of styrene before heating to 70° C. Then, tert-butyl hydroperoxide (0.1% in water) and Brüggolit (sodium hydroxymethanesulfinate; 0.15% in water) were metered in continuously at a 10 g/h rate of addition in each case. Starting with the onset of polymerization, apparent from the increased internal temperature, the remaining monomer mixture consisting of 1950 g of butyl acrylate and 1150 g of styrene was metered in continuously at an 885 g/h rate of addition over 3.5 h. Three hours after onset of the polymerization, the rate of addition of the initiator was continuously raised to 60 g/h over 1 h. The polymerization was carried on until no further heat of polymerization was released. To remove residual monomers, the polymerization was completed with 10 g of tert-butyl hydroperoxide (10% in water) and 20 g of Brüggolit (10% in water) after cooling down to 30° C. The dispersion obtained had a solids content of 53.7%, a Brookfield viscosity (spindle 2) of 680 mPas, a pH of 4.3 and a Dw particle size diameter of 800 nm. On sieving through a sieve of 250 μm mesh size, 2 g of sieve residue were obtained. The free residual monomer content was <100 ppm.

Preparation of Polymer Powders:
Comparative Powder 1 (CPowder 1):
90 wt % of the dispersion of the base polymer was admixed with 10 wt % (solids/solids) of Mowiol 4/88 polyvinyl alcohol having a hydrolysis level of 88 Mol % and a Höppler viscosity of 4 mPas, and diluted with water to a Höppler viscosity of 250 mPas. The dispersion was spray dispensed through a two-material nozzle. The atomizing component used was compressed air at 4 bar, while the droplets formed were concurrently dried with heated air at 125° C. The dry powder obtained was admixed with 10 wt % of commercially available antiblocking agent (mixture of calcium magnesium carbonate and magnesium hydrosilicate).

Comparative Powder 2 (CPowder 2):

Identical to CPowder 1 except that 80 wt % of the dispersion of the base polymer (solids/solids) was used and the dispersion was additionally admixed with 10 wt % of Epilox P 13-31 (triglycidyl ether based on trimethylolpropane from Leuna-Harze).

Powder 3:

Identical to CPowder 1 except that the Mowiol 4/88 polyvinyl alcohol was replaced by the corresponding amount (solids/solids) of the modified water-soluble polymer from Example 1.

Powder 4:

Identical to CPowder 1 except that 80 wt % of the dispersion of the base polymer (solids/solids) was used and the dispersion was additionally admixed with 10 wt % of Epilox P 13-31 (triglycidyl ether based on trimethylolpropane from Leuna-Harze).

Testing of Strength of Films from Polymer Powders:

Determination of Breaking Strength:

The (comparative) powders were converted 50 g at a time into redispersions having a solids content of 50% by addition of water. The particular redispersion was optionally admixed with Jeffamine T-403 hardener, in the amount reported in table 3. Some of the particular redispersion was applied to a glass plate and dried for one week under normal conditions pursuant to DIN50014 to obtain a polymer film 0.2 mm in thickness.

The particular polymer film was then stored in water at 21° C. for three days and subsequently subjected to a DIN 5304 tensile test. The test results are itemized in table 3.

Determination of Stain Resistance:

Polymer films were prepared as described under the heading of "Determination of breaking strength". The particular dried polymer film was pipetted with coffee and/or redcurrant juice and then stored overnight under standard conditions (DIN 50014 23/50). Thereafter, the polymer films were washed with warm water at 23° C. and visually evaluated as follows:

+++ no visible stain;
++ barely visible stain;
− visible stain.

The results are summarized in table 3.

Stability of Filled Moldings:

50 g of the particular (comparative) powder were mixed with sand (BCS 413, average particle size 130 micrometers) in a weight ratio of 1:2 and blended with the hardener quantity reported in table 3. Water was then admixed, redispersing the (comparative) powders. The molding compositions thus obtained were introduced into a mold (length/width/height=10 cm/1 cm/4 mm) and dried. The moldings thus obtained were stored in water at room temperature and 7 days later evaluated for stability as follows:

stable: the molding remained dimensionally stable after water storage;
disintegrated: molding is disintegrated into fragments after water storage.

The results of the testing are listed in the "Stability" column of the table which follows.

Comparative Powder 1 without added hardener gave the worst results (table 3). Modifying the powder with an epoxy compound and an amine hardener did improve the breaking strength of the polymer film and the stability of the molding material, but there was still no stain resistance (table 3: CPowder 2). Inventive powders 3 and 4 led to molding materials having the desired breaking strength and stability, but also to stain-resistant moldings.

TABLE 3

Testing of polymer films based on modified water-soluble polymers, base polymers and optionally hardeners:

| Powder | Hardener* [g] | Breaking strength [Mpa] | Stability | Stain resistance coffee | redcurrant juice |
|---|---|---|---|---|---|
| CPowder 1 | — | 7.1 | disintegrated | − | − |
| CPowder 2 | 3.0 | 9.2 | Stable | − | − |
| Powder 3 | 0.8 | 8.2 | Stable | ++ | ++ |
| Powder 4 | 3.0 | 10.5 | stable | +++ | +++ |

*Jeffamine T-403: polyetheramine from Huntsman.

What is claimed is:

1. Crosslinkable, modified water-soluble polymer compositions, comprising at least one modified water-soluble polymer obtained by free-radically initiated polymerization of:
   a) one or more ethylenically unsaturated monomers bearing one or more epoxy, amine, carboxylic acid, carboxylic anhydride and/or silane groups; and
   b) 5 to 65 wt. %, based on the overall weight of the crosslinkable, modified water-soluble polymer, of one or more ethylenically unsaturated monomers other than monomers a); in the presence of 25 to 80 wt % of one or more water-soluble polymers, based on the overall weight of the modified water-soluble polymers.

2. The crosslinkable modified water-soluble polymer composition of 1, wherein one or more monomers a) are selected from the group consisting of glycidyl acrylate, glycidyl methacrylate, allyl glycidyl ether; 2-dimethylaminoethyl methacrylate, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine or vinylpyridine; acrylic acid, methacrylic acid, fumaric acid, maleic acid; monoesters of fumaric acid, monoesters of maleic acid, and maleic anhydride.

3. The crosslinkable modified water-soluble polymer composition of claim 1, wherein one or more monomers a) are selected from the group consisting of ethylenically unsaturated silicon compounds of the formula $R^1SiR^2_{0-2}(OR^3)_{1-3}$, where $R^1$ is $CH_2=CR^4-(CH_2)_{0-1}$ and $CH_2=CR^4CO_2(CH_2)_{1-3}$, $R^2$ is $C_1$-$C_3$ alkyl, $C_1$-$C_3$ alkoxy or halogen, $R^3$ is branched or unbranched, optionally substituted alkyl of 1 to 12 carbon atoms or acyl of 2 to 12 carbon atoms, wherein $R^3$ is optionally interrupted by an ether group, and wherein $R^4$ is H or $CH_3$; and silane group-containing (meth)acrylamides of the formula $CH_2=CR^5-CO-NR^6-R^7-SiR^8_n-(R^9)_{3-m}$, where m=0 to 2, n=0 to 2, and m+n=3, $R^5$ is either H or methyl, $R^6$ is H or alkyl of 1 to 5 carbon atoms; $R^7$ is alkylene of 1 to 5 carbon atoms or a bivalent organic group in which the carbon chain is interrupted by an oxygen or nitrogen atom, $R^8$ is alkyl of 1 to 5 carbon atoms, $R^9$ is alkoxy of 1 to 40 carbon atoms which are each optionally substituted with further heterocycles.

4. The crosslinkable modified water-soluble polymer composition of claim 1, wherein the monomers a) are employed in an amount of 0.5 to 60 wt %, based on the overall weight of the modified water-soluble polymers.

5. The crosslinkable modified water-soluble polymer composition of claim 1, wherein one or more monomers b) are selected from the group consisting of vinyl esters, (meth)acrylic esters, vinylaromatics, olefins, 1,3-dienes and vinyl halides.

6. The crosslinkable modified water-soluble polymer composition of claim 2, wherein one or more monomers b) are selected from the group consisting of vinyl esters, (meth)acrylic esters, vinylaromatics, olefins, 1,3-dienes and vinyl halides.

7. The crosslinkable modified water-soluble polymer composition of claim 3, wherein one or more monomers b) are selected from the group consisting of vinyl esters, (meth)acrylic esters, vinylaromatics, olefins, 1,3-dienes and vinyl halides.

8. The crosslinkable modified water-soluble polymer composition of claim 1, wherein one or more water-soluble polymers are selected from the group consisting of proteins, ligninsulfonates, formaldehydesulfonates, polysaccharides in water-soluble form, polymers containing one or more units selected from the group consisting of vinyl alcohol units, vinylpyrrolidone units, vinyl acetal units, vinylsulfonic acid units, acrylamide units, units of ethylenically unsaturated carboxylic acids, ethylenically unsaturated amines, and ammonium compounds.

9. The crosslinkable modified water-soluble polymer composition of claim 1, wherein one or more water-soluble polymers are selected from the group consisting of polyvinyl alcohols; polyvinyl acetals; polyvinylpyrrolidones; polysaccharides in water-soluble form, celluloses and their carboxymethyl, methyl, hydroxyethyl and hydroxypropyl derivatives, dextrins, cyclodextrins, proteins; ligninsulfonates, and synthetic polymers.

10. The crosslinkable modified water-soluble polymer composition of claim 1, wherein one or more water-soluble polymers are selected from the group consisting of amylose and amylopectin, casein or caseinate, soyprotein, gelatin; poly(meth)acrylic acid, copolymers of (meth)acrylates with carboxyl-functional comonomer units, poly(meth)acrylamide, polyvinylsulfonic acids and their water-soluble copolymers; melamineformaldehydesulfonates, naphthaleneformaldehydesulfonates, cresolformalde-hydesulfonates, styrene-maleic acid copolymers, and vinyl ether-maleic acid copolymers.

11. The crosslinkable modified water-soluble polymer composition of claim 1, wherein the polymerization is initiated with one or more initiators and ≥20 wt % of initiators, based on the overall weight of all the initiator(s) used in the polymerization, is initially charged before initiation of the polymerization and a remaining portion of the initiator(s) is metered in during the polymerization.

12. The crosslinkable modified water-soluble polymer composition of claim 1, wherein at least 50 wt % of the water-soluble polymer(s) is initially charged before initiation of the polymerization, based on the total amount of water-soluble polymer(s) employed.

13. The crosslinkable modified water-soluble polymer composition of claim 1, wherein from 0 to 20 wt % of said monomers a) and b), based on the overall amount of a total amounts of monomers a) and b), is initially charged before initiation of the polymerization and the remainder of monomers a) and b) is metered in during the polymerization.

14. The crosslinkable modified water-soluble polymer composition of claim 1, wherein one or more modified water-soluble polymers are present as a constituent of a crosslinking agent composition additionally containing one or more components from the group consisting of base polymers, epoxy components, hardeners and additives.

15. The crosslinkable modified water-soluble polymer composition of claim 1, which is employed in chemical products used in civil engineering, and in coatings or adhesives.

16. The crosslinkable modified water-soluble polymer composition of claim 1, which is employed in chemical products as coatings or adhesives for woven or nonwoven textiles, paper or fibers.

17. A process for preparation of a crosslinked article or portion thereof, comprising supplying a crosslinkable modified water-soluble polymer composition of claim 1, and crosslinking.

18. The process of claim 17, wherein the crosslinkable modified water-soluble polymer composition further comprises at least one of base polymers, epoxy components, hardeners and additives.

19. The process of claim 17, wherein crosslinking is effected by heating to a temperature 30° C. or above.

20. The crosslinkable, water-soluble polymer composition of claim 1, wherein the one or more ethylenically unsaturated monomers a) are selected from the group consisting of ethylenically unsaturated monomers bearing on or more epoxy groups, silane groups, or mixtures thereof.

21. A crosslinkable, modified water-soluble polymer composition consisting of:
   one or more modified water-soluble polymers, and
   optionally one or more components selected from the group consisting of base polymers, epoxy components, hardeners and additives, wherein said modified water-soluble polymers are obtained by free-radically initiated polymerization of monomers consisting of:
   a) one or more ethylenically unsaturated monomers bearing one or more epoxy and/or silane groups, and
   b) one or more ethylenically unsaturated monomers other than monomers a), selected from the group consisting of vinyl esters, (meth)acrylic esters, vinylaromatics, ethylene, propylene and vinyl halides, and
   c) optionally one or more ethylenically unsaturated monomers other than said monomers a) and b) selected from the group consisting of ethylenically unsaturated carboxamides, carbonitriles, diesters of fumaric acid and maleic acid, ethylenically unsaturated sulfonic acids and/or salts thereof, diallyl phthalate, divinyl adipate, diallyl maleate, allyl methacrylate or triallyl cyanurate, acrylamidoglycolic acid, methylacrylamidoglycolic methyl ester, N-methylolacrylamide, N-methylol-methacrylamide, N-methylolallyl carbamate, isobutoxy ether or esters of N-methylolacrylamide, of N-methylolmethacrylamide and of N-methylolallyl carbamate, hydroxyalkyl esters of methacrylic acid and of acrylic acid, diacetoneacrylamide, acetylacetoxyethyl acrylate and methacrylate,
   in the presence of 25 to 80 wt % based on the overall weight of the modified water-soluble polymer of one or more water-soluble polymers;
   wherein the base polymers are selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride and styrene-acrylic ester copolymers, and mixtures thereof;

wherein the base polymers is stabilized by at least one emulsifier or protective colloid or by a mixture thereof;

wherein the epoxy components are polyethers having two or more epoxy groups;

wherein the hardeners are selected from the group consisting of amines and silanes; and optionally, one or more additives selected from the group consisting of fillers, pigments, plasticizers, foam stabilizers, flame retardants, hydrophobicizing agents, oils, polyurethanes and polysiloxanes.

* * * * *

UNITED STATES PATENT AND TRADEMARK OFFICE
CERTIFICATE OF CORRECTION

PATENT NO. : 9,850,327 B2
APPLICATION NO. : 15/023574
DATED : December 26, 2017
INVENTOR(S) : Abdulmajid Hashemzadeh et al.

It is certified that error appears in the above-identified patent and that said Letters Patent is hereby corrected as shown below:

In the Claims

Column 21, Line 47, Claim 10:
After "naphtaleneformaldehydesulfonates,"
Delete "cresolformalde-hydesulfonates" and
Insert -- cresolformaldehydesulfonates --.

Column 22, Line 28, Claim 20:
After "unsaturated monomers bearing"
Delete "on" and
Insert -- one --.

Signed and Sealed this
Seventeenth Day of April, 2018

Andrei Iancu
*Director of the United States Patent and Trademark Office*